United States Patent
Brock

(10) Patent No.: US 8,082,369 B2
(45) Date of Patent: Dec. 20, 2011

(54) SYSTEM AND METHOD FOR CONFIGURING AN ELECTRONIC DEVICE

(75) Inventor: Chris Brock, Manorville, NY (US)

(73) Assignee: Symbol Technologies, Inc., Holtsville, NY (US)

(*) Notice: Subject to any disclaimer, the term of this patent is extended or adjusted under 35 U.S.C. 154(b) by 190 days.

(21) Appl. No.: 12/330,036

(22) Filed: Dec. 8, 2008

(65) Prior Publication Data

US 2010/0146155 A1  Jun. 10, 2010

(51) Int. Cl.
*G06F 3/00* (2006.01)
*G06F 12/00* (2006.01)

(52) U.S. Cl. .......................... 710/11; 711/170

(58) Field of Classification Search .................. 710/11
See application file for complete search history.

(56) References Cited

U.S. PATENT DOCUMENTS

| 6,269,481 | B1* | 7/2001 | Perlman et al. | 717/178 |
| 6,434,643 | B1* | 8/2002 | Ejiri | 710/58 |
| 6,789,111 | B1* | 9/2004 | Brockway et al. | 709/222 |
| 7,539,808 | B2* | 5/2009 | Kojima | 710/302 |

FOREIGN PATENT DOCUMENTS

| EP | 1672492 | 3/2008 |
| WO | 02067483 | 8/2002 |
| WO | 2004008314 | 1/2004 |

* cited by examiner

*Primary Examiner* — Henry Tsai
*Assistant Examiner* — Juanito Borromeo
(74) *Attorney, Agent, or Firm* — Nong-Qiang Fan

(57) ABSTRACT

A system and method configures an electronic device. The method comprises detecting a coupling of a peripheral device to a host device. The peripheral device appears as a compound device including an interface device and a communications device. The method comprises identifying a protocol utilized by the communications device. The method comprises generating a communications link between the communications device and the host device when the protocol is compatible with a driver of the host device.

20 Claims, 2 Drawing Sheets

SYSTEM AND METHOD FOR CONFIGURING AN ELECTRONIC DEVICE

FIELD OF THE INVENTION

The present invention relates generally to a system and method for configuring an electronic device. Specifically, a driver of a host device may be configured to be compatible with a protocol of a peripheral device connected thereto to enable bi-directional communication.

BACKGROUND

When a peripheral device is coupled to a host device, the peripheral device will utilize a predetermined communication protocol to interface with the host device. However, the protocol may not support configuration of the peripheral device either directly with predefined commands or indirectly with encapsulated commands in the protocol. For example, the protocol may not be capable of transmitting configuration data to the peripheral device. To establish a communication link between the peripheral device and the host device which provides for transmission of the configuration data, the peripheral device must switch communication protocols. This is conventionally done manually. For example, a scanner coupled to a computer would have to scan one or more barcodes to switch protocols to establish the communication link and then scan one or more further barcodes to obtain the configuration data.

The peripheral device is typically manually configured with settings input by an installer. Attempts by untrained personnel to accomplish hardware and software installation of the peripheral device may result in wasted time, un-needed repair requests when the peripheral device is working properly but has been installed incorrectly, etc. Costs are also incurred when outside personnel (e.g., IT staff) are contracted to install, configure and troubleshoot the peripheral devices. Furthermore, when non-standard protocols are utilized by the peripheral device, a configuration may be required to be aborted manually when the non-standard protocol is not recognized by the host device.

SUMMARY OF THE INVENTION

The present invention relates to a system and method for configuring an electronic device. The method comprises detecting a coupling of a peripheral device to a host device. The peripheral device appears as a compound device including an interface device and a communications device. The method comprises identifying a protocol utilized by the communications device. The method comprises generating a communications link between the communications device and the host device when the protocol is compatible with a driver of the host device.

DETAILED DESCRIPTION

Figure 1:
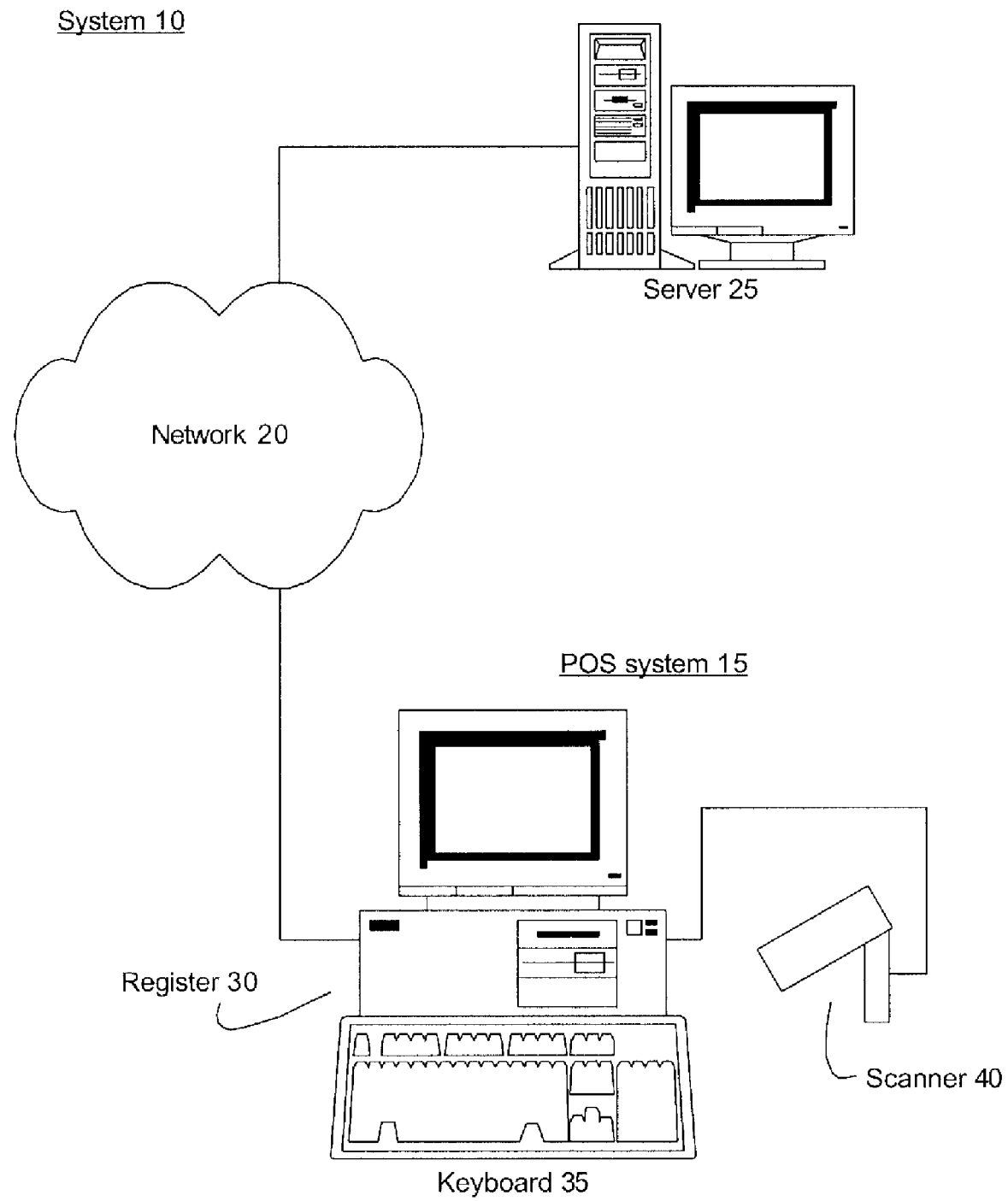
FIG. 1 shows a system for configuring an electronic device according to an exemplary embodiment of the present invention.

The exemplary embodiments of the present invention may be further understood with reference to the following description and the appended drawings, wherein like elements are provided with the same reference numerals. The exemplary embodiments of the present invention may be related to a system and method for automating a process of establishing a communication between a host device and a peripheral device. In the exemplary embodiments, the present invention will be described with reference to installing and configuring a peripheral device in a point-of-service (POS)/sale environment to a host device. However, those skilled in the art will understand that the present invention may be implemented in any computing environment in which one or more peripheral devices are coupled to the host device such as industrial, warehouse, manufacturing and healthcare environments.

FIG. 1 shows a system 10 for configuring an electronic device according to an exemplary embodiment of the present invention. In the exemplary embodiment, the system 10 may be implemented in a retail store having a plurality of point-of-service/sale (POS) systems (e.g., a POS system 15) which may communicate with a server 25 via a communications network 20 (e.g., a wired/wireless LAN, Ethernet, token-ring, frame relay, etc.). In operation, the server 25 may fulfill data requests from the POS system 15 when, for example, the POS system 15 transmits a price request for an item identified during a checkout. Those skilled in the art will understand that the POS system 15 may be utilized in an assisted-checkout manner (e.g., store employee scanning items and processing payment) and/or in a self-checkout manner (e.g., customer scans items and processes payment).

The POS system 15 may comprise a host device (e.g., a register 30, a computer, etc.) and one or more peripheral devices coupled thereto (e.g., a keyboard 35, a scanner 40, a display, a keypad, a mouse, a printer, a magnetic strip/smart card interface, an image-based scanner, a laser-based scanner, a linear CCD-scanner, a contact scanner, an RFID reader and a magnetic strip reader, etc.). The host device may be a stand alone register, computer, thin client device, network-bootable device, mobile device, etc. In the exemplary embodiment, the register 30 may be a PC, laptop or other computing unit which includes an operating system, applications and drivers and is enabled for communication on the network 20. That is, the register 30 may include an Ethernet port for communicating on a LAN, a radio frequency transceiver for communicating on a wireless LAN, and/or other network connection. The register 30 further includes one or more host-peripheral interfaces for coupling to the peripheral device(s). The hardware port used for attaching each of the peripheral devices may be selected based on a corresponding interface used thereby. For example, the keyboard 35 and the scanner 40 may connect to USB ports or Bluetooth® connections on the register 30, while the printer and the display may utilize RS-232 ports. While the exemplary embodiment will be described with reference to the USB ports, those skilled in the art will understand that the present invention may be implemented for any host device with at least one host-peripheral interface.

As is common in retail environments, the peripheral devices may be interchangeably used with the POS system 15. For example, the peripheral devices may be added, removed, re-installed, upgraded, temporarily removed for maintenance, etc. To save costs, a retail store operator may ask a store employee to install and configure the peripheral devices. The installation may typically require a hardware connection (e.g., via the hardware port) and a software connection (e.g., installing a driver for the peripheral device on the register 30). The software connection may also require configuring software settings such as drive mapping, data routing, etc. An untrained employee may encounter several problems with these tasks, requiring help from in-house or contracted IT personnel. In either instance, costs are incurred by the retail store operator, because manual installation of the peripheral device requires technical understanding which a typical store employee may not possess.

According to the present invention, the POS system 15 may include an application or a driver, embodied in software and/or hardware, which controls configuration of the peripheral device. The driver of the POS system 15 may be a Remote Scanner Management (RSM) driver. The RSM driver may be configured to control devices such as, for example, removable peripheral devices that may be connected and disconnected from the POS system 15. As will be discussed in further detail below, the RSM driver may be associated with various protocols to enable the controlling of the removable devices.

According to the exemplary embodiments of the present invention, the driver detects a connection of peripheral devices to the register 30. The peripheral device may be configured to virtually appear to the driver as a compound device. For example, the driver may virtually view the connected peripheral device as two or more separate devices. The first device that the peripheral device may appear to the POS system 15 may be a human interface device (HID) keyboard. The HID keyboard may include a broadly defined protocol that may conform easily to a variety of drivers installed for the POS system 15. Thus, the peripheral device appearing as the HID keyboard may enable a substantially guaranteed conforming with the POS system 15, thereby enabling the user to enter data inputs. The second device that the peripheral device may appear to the POS system 15 may be as a bidirectional communications device. The bidirectional communications device may include a protocol that enables the bidirectional communications. For example, the protocol may be a standard one such as CDC Serial Emulation. In another example, the protocol may be a proprietary one (i.e., non-standard) and may also be product specific such as Special Needs Application Programming Interface (SNAPI).

By providing a virtual appearance to the POS system 15, the HID portion may be generally accepted using USB hosts. Furthermore, the bi-directional communications portion may be used to enable an active managing and controlling of the peripheral device via the RSM driver. Those skilled in the art will understand that when a peripheral device is configured with the HID mode, the user may be prevented from personalizing the peripheral device as desired and will be forced to use the configurations set for the peripheral device as dictated by the HID mode.

While the exemplary embodiments describe the application as residing in the driver, those skilled in the art will understand that the application may reside within the register 30, outside of the driver, at the server 25, on a removable storage medium, etc.

As is known in the art, when the peripheral device (e.g., the scanner 40) is coupled to the register 30 (via the USB port), the register 30 may request that the scanner 40 describe itself by supplying enumeration data. While the exemplary embodiment will be described with reference to the scanner 40, those skilled in the art will understand that the other embodiments may reference any of the peripheral devices described herein and/or commonly known in the art. The enumeration data may be included in a series of fields which are defined in the host-peripheral interface such as a USB standard or a Bluetooth® standard. The enumeration data provided in, for example, a device-class field, a device-sub-class field and/or a device-protocol field may be used by the register 30 to determine whether the scanner 40 is utilizing a conforming protocol that is compatible with the driver of the register 30.

The register 30 may utilize conventional host-side USB software to determine the communication protocol utilized by the scanner 40 when virtually appearing as the second device to the register 30. That is, the USB standard defines several device-class types such as, for example, a "mass-storage device", a HID, etc. In the exemplary embodiment, the register 30 determines the communication protocol used by the virtual second device of the scanner 40 based on the enumeration data provided. For example, the enumeration data from the scanner 40 may be indicative of a "USB HID keyboard device" which utilizes a protocol. When the RSM driver of the register 30 recognizes the protocol, the register 30 works with the scanner 40 since the protocol is supported by the RSM driver. When the RSM driver of the register 30 does not recognize the protocol, the RSM driver requests the scanner 40 to re-enumerate to a supported protocol, thereby enabling the register 30 to work with the scanner 40.

In an exemplary embodiment where the register 30 does not recognize the protocol and the scanner 40 is incapable of being re-enumerated to a supported protocol, a user may abort the procedure. The user may be required to manually abort the procedure, thereby providing an indication that the scanner 40 is incompatible with the register 30. It should be noted that the RSM driver may be updated in a variety of manners so that the procedure may not be required to be aborted. In a first example, if the register 30 is associated with a network including a database with a most current list of available protocols, the RSM driver residing on the register 30 may be updated to incorporate all available protocols. In such an exemplary embodiment, an overall reduction of procedures that are aborted is achieved. In a second example, the RSM driver of the register 30 may be configured to support a preset number of protocols. The preset number may relate to popularly used protocols by the scanner 40. When a protocol that is not supported by the RSM driver is used by the scanner 40, the RSM driver may also be manually updated, for example, via the connection to the network, receiving a storage device that includes additional supported protocols, etc.

Figure 2:
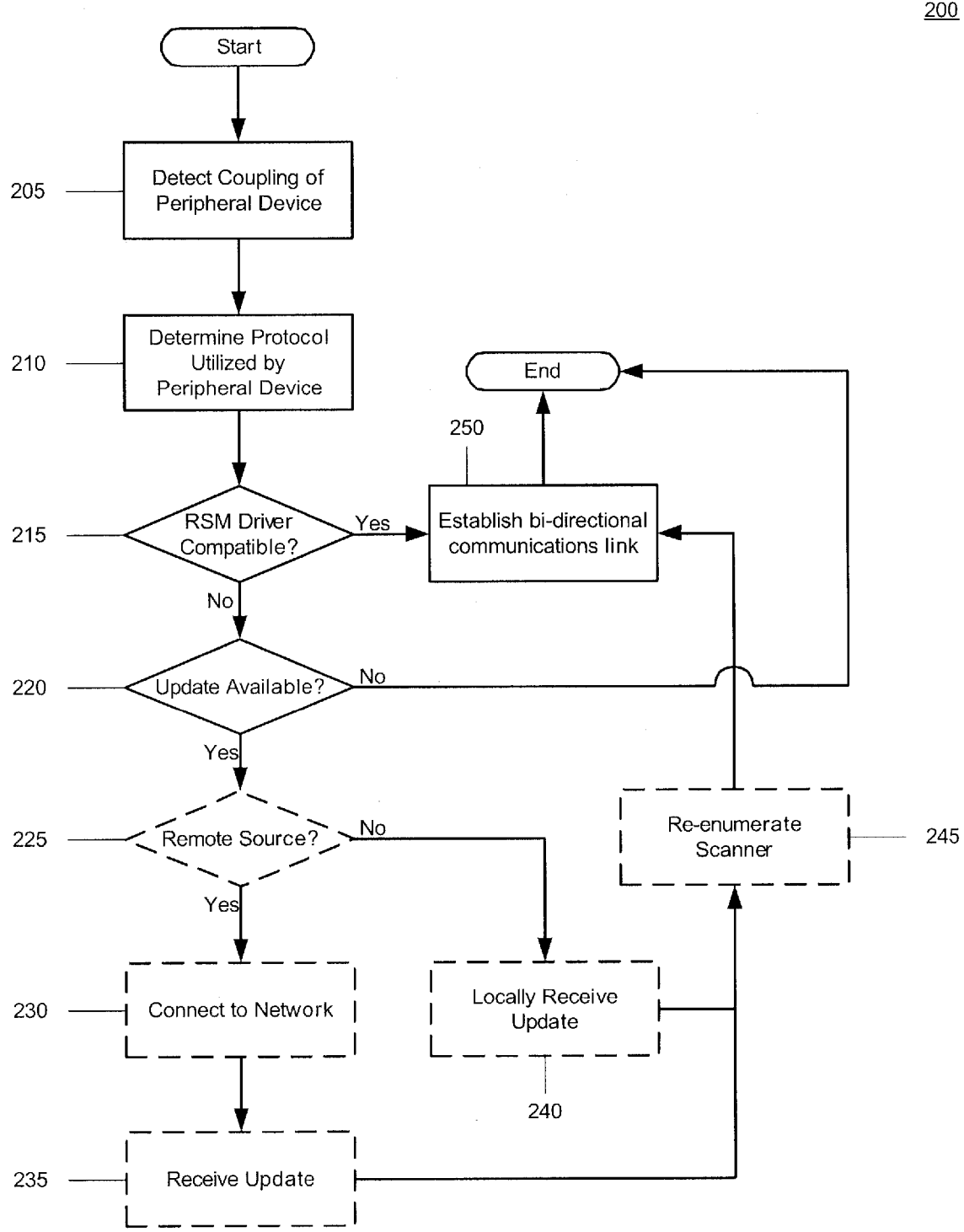
FIG. 2 shows a method for configuring an electronic device according to an exemplary embodiment of the present invention.

FIG. 2 shows an exemplary embodiment of a method 200 according to the present invention. The method 200 will be described with reference to the system 10 of FIG. 1. Specifically, the method 200 will be described with reference to the register 30 of the POS system 15 of FIG. 1.

It should be noted that various steps may be assumed to have already been performed prior to the method 200. For example, the RSM driver may have already been installed on the register 30 in any conventional manner. The driver may be installed from a removable storage medium (e.g., floppy, CD/DVD, pen drive, etc.) or downloaded from the server 25.

In step 205, the RSM driver detects when the peripheral device such as the scanner 40 is coupled to the register 30. As discussed above, the register 30 may include a connection port such as a USB. Through conventional detection methods, the RSM driver may determine when the peripheral device has been connected to the register 30. Furthermore, as discussed above, when the RSM driver detects the coupling of the peripheral device, the peripheral device virtually appears as a compound device.

A subsequent step to step 205 may be for a receiving of enumeration data that is supplied by the peripheral device to the register 30. The enumeration data may indicate that the peripheral device is a particular type of device. According to the exemplary embodiments of the present invention, the enumeration data that is provided may indicate that a HID and a bi-directional communications device have been coupled.

In step 210, the driver determines a protocol used by the peripheral device. In the exemplary embodiment, the driver monitors the enumerations on the host-peripheral interface. As stated above, after the scanner 40 is coupled to the register 30, the enumeration data of the scanner 40 is requested by the register 30. Using the enumeration data in the device-class, device-subclass and/or device-protocol fields, the driver determines the protocol used by the virtual bidirectional communications device of the scanner 40.

In step 215, a determination is made whether the protocol used by the virtual bidirectional communications device is compatible with the RSM driver of the scanner 40. As discussed above, the RSM driver may be configured to be compatible with a predetermined list of protocols. For example, the RSM driver may be configured to be compatible with standard protocols and certain non-standard protocols.

When the protocol used by the virtual bidirectional communications device is compatible with the RSM driver, the method 200 continues to step 250. In step 250, a bidirectional communications link is established between the scanner 40 and the register 30. Once the link is established, the determined protocol that is compatible with the RSM driver enables data to be properly exchanged between the scanner 40 and the register 30.

When the protocol used by the virtual bidirectional communications device is incompatible with the RSM driver, the method 200 may end. In one exemplary embodiment, the user may be prompted for a manual canceling of the procedure for establishing a communication link between the register 30 and the scanner 40. In a second exemplary embodiment, the register 30 may request the scanner 40 to re-enumerate to a supported protocol.

In step 220, a determination may be made whether an update is available for the RSM driver. The update for the RSM driver may be determined from a variety of sources. In a first example, the update may be provided from a remote source such as a network resource (e.g., a database of the network 20). In a second example, the update may be provided from a local source. The local source may be a memory of the register 30 that includes the various updates not currently installed for the RSM driver. The local source may also be a separate resource possessed by the user such as a CD-ROM containing various updates. When no update is available for the RSM driver (e.g., the protocol is proprietary and only a specified driver is compatible therewith), the method 200 may end. As discussed above, the user may be prompted to provide a manual abort for the procedure of establishing the communication link between the scanner 40 and the register 30.

If it is determined that the update is available, the method continues to step 225 where a determination is made whether the source for the update is a remote source. As discussed above, the register 30 may be communicatively connected to the network 20. A network resource such as the server 25 and/or a database of the network may be the remote source that is configured to provide the update. If the update is available via the remote source, the method 200 continues to step 230 where the register 30 connects to the network (if not already connected). The register 30 may connect to the network 20 through a variety of manners. In a first example, the register 30 may include a wireless interface to communicatively connect to the network 20 when disposed in an operating area provided by the network 20. In a second example, the register 30 may include a wired connection to the server 25. In step 235, the register 30 receives the update for the RSM driver from the network 20. If the update is available via the local source, the method 200 continues to step 240 where the register 30 receives the update locally such as from a memory of the register 30, a local source (e.g., CD-ROM), etc.

Once the register 30 receives the update remotely via steps 230-235 or locally via step 240, the method 200 continues to step 245 where the scanner may be re-enumerated according to the specifications of the updated protocol. The received update of either step 235 or step 240 may correspond to the protocol used by the virtual bidirectional communications device. Thus, by re-enumerating the scanner according to the updated protocol, the RSM driver may now be compatible with the protocol determined in step 210. Consequently, the bidirectional communications link may be established in step 250 between the register 30 and the scanner 40.

Those skilled in the art will understand that the above described exemplary embodiments may be implemented in any number of manners, including, as a separate software module, as a combination of hardware and software, etc. For example, the re-enumeration of the RSM driver may be performed by a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    detecting a coupling of a barcode scanner to a host device, the host device having a driver installed therein and configured to virtually view the connected barcode scanner as two or more separate devices, the barcode scanner appearing as a compound device including an interface device and a communications device, wherein the barcode scanner includes at least one of an image-based scanner and a laser-based scanner;
    identifying a protocol utilized by the communications device; and
    generating a communications link between the communications device and the host device when the protocol is compatible with the driver of the host device.

2. The method according to claim 1, wherein the interface device is configured with a further protocol that is compatible with the driver.

3. The method according to claim 2, further comprising:
    generating a communications link between the interface device and the host device according to specifications of the further protocol.

4. The method according to claim 1, wherein the protocol of the communications device is one of a standard protocol and a proprietary protocol.

5. The method according to claim 1, further comprising:
    monitoring enumerations on a host-peripheral interface in the host device.

6. The method according to claim 5, further comprising:
    receiving enumeration data from the barcode scanner; and
    identifying the protocol as a function of the enumeration data.

7. The method according to claim 1, further comprising:
    determining whether the protocol is incompatible with the driver.

8. The method according to claim 7, further comprising:
    manually canceling the generating step when the protocol is incompatible.

9. The method according to claim 7, further comprising:
    determining whether an update for the driver is available one of remotely and locally, the update relating to the protocol.

10. The method according to claim 9, further comprising:
re-enumerating the driver according to the update, thereby making the driver compatible with the protocol.

11. A system, comprising:
   a host device;
   a barcode scanner coupled to the host device, the host device having a driver installed therein and configured to virtually view the connected barcode scanner as two or more separate devices, the barcode scanner appearing as a compound device including an interface device and a communications device, and wherein the barcode scanner includes at least one of an image-based scanner and a laser-based scanner; and
   wherein, upon identifying a protocol utilized by the communications device, a communications link is generated between the communications device and the host device when the protocol is compatible with the driver of the host device.

12. The system according to claim 11, wherein the interface device is configured with a further protocol that is compatible with the driver.

13. The system according to claim 11, wherein the protocol of the communications device is one of a standard protocol and a proprietary protocol.

14. The system according to claim 11, wherein the host device further comprises a host-peripheral interface monitoring enumerations.

15. The system according to claim 14, wherein the host device receives enumeration data from the barcode scanner and identifies the protocol as a function of the enumeration data.

16. The system according to claim 11, wherein the host device determines whether the protocol is incompatible with the driver.

17. The system according to claim 16, wherein the host device requires a manual canceling of the generating step when the protocol is incompatible.

18. The system according to claim 16, wherein the host device determines whether an update for the driver is available one of remotely and locally, the update relating to the protocol.

19. The system according to claim 18, wherein the driver is re-enumerated according to the update, thereby making the driver compatible with the protocol.

20. A computer readable storage medium including a set of instructions executable by a processor, the set of instructions operable to:
   detect a coupling of a barcode scanner to a host device, the host device having a driver installed therein and configured to virtually view the connected barcode scanner as two or more separate devices, the barcode scanner appearing as a compound device including an interface device and a communications device, wherein the barcode scanner includes at least one of an image-based scanner and a laser-based scanner;
   identify a protocol utilized by the communications device; and
   generate a communications link between the communications device and the host device when the protocol is compatible with the driver of the host device.

* * * * *